(12) United States Patent
Manzoni et al.

(10) Patent No.: US 12,735,114 B2
(45) Date of Patent: Sep. 15, 2026

(54) AUTOMOBILE WITH IMPROVED PASSENGER COMPARTMENT

(71) Applicant: FERRARI S.P.A., Modena (IT)

(72) Inventors: Flavio Manzoni, Modena (IT); Matteo De Petris, Modena (IT)

(73) Assignee: FERRARI S.P.A., Modena (IT)

( * ) Notice: Subject to any disclaimer, the term of this patent is extended or adjusted under 35 U.S.C. 154(b) by 441 days.

(21) Appl. No.: 18/306,622

(22) Filed: Apr. 25, 2023

(65) Prior Publication Data

US 2023/0347987 A1 Nov. 2, 2023

(30) Foreign Application Priority Data

Apr. 29, 2022 (IT) ........................ 102022000008570

(51) Int. Cl.
*B62D 25/04* (2006.01)
*B60J 1/02* (2006.01)

(52) U.S. Cl.
CPC ................ *B62D 25/04* (2013.01); *B60J 1/02* (2013.01)

(58) Field of Classification Search
CPC ................................... B60J 1/02; B62D 25/04
See application file for complete search history.

(56) References Cited

U.S. PATENT DOCUMENTS

| | | | |
|---|---|---|---|
| 5,009,463 A | 4/1991 | Saitoh | |
| 2002/0073623 A1* | 6/2002 | Sakamoto | B60J 5/0479 49/366 |
| 2012/0119477 A1* | 5/2012 | Kim | B60R 22/24 296/193.06 |

FOREIGN PATENT DOCUMENTS

| | | | |
|---|---|---|---|
| CN | 1964870 B | 12/2011 | |
| DE | 10347847 B3 * | 4/2005 | B62D 23/00 |
| GB | 961121 A | 6/1964 | |
| GB | 2306408 A | 5/1997 | |
| IT | 201800006203 A1 | 12/2019 | |

OTHER PUBLICATIONS

Italian Search Report for Application No. 102022000008570; Filing Date: Apr. 29, 2022; Date of Mailing—Nov. 28, 2022, 8 pages.
Office Action for European Application No. 23169957.0, Dated: Jun. 29, 2026; 7 pages.

* cited by examiner

*Primary Examiner* — Dany E Akakpo
(74) *Attorney, Agent, or Firm* — CANTOR COLBURN LLP

(57) ABSTRACT

Automobile comprising a pair of front wheels, a pair of rear wheels and an outer body having a floor, a front hood, a roof, and a windscreen extending between the front hood and the roof; the automobile further comprises a passenger compartment, which is obtained inside the outer body between the front and rear wheels, is frontally delimited by the windscreen and defines at least one driving position and one front passenger position side by side; advantageously, the automobile is provided, inside the passenger compartment, with a central pillar extending between the floor and the roof and arranged in the area of an intermediate longitudinal axis of the passenger compartment between the driving position and the front passenger position.

6 Claims, 3 Drawing Sheets

5
23
23
17
17
18
18
22
22
23
23
24
15
20
21
19
18
6
18
16
A

AUTOMOBILE WITH IMPROVED PASSENGER COMPARTMENT

CROSS-REFERENCE TO RELATED APPLICATIONS

This patent application claims priority from Italian patent application no. 102022000008570 filed on Apr. 29, 2022, the entire disclosure of which is incorporated herein by reference.

TECHNICAL FIELD

The invention relates to an automobile with an improved passenger compartment, in particular of the kind with four or five seats, to which explicit reference will be made in the description below without, because of this, losing generality.

PRIOR ART

As it is known, an automobile has two front wheels and two rear wheels and comprises an outer body and a passenger compartment, which is obtained within the outer body between the front and rear wheels.

In particular, automobiles with four or five seats are known, wherein, along each side, the passenger compartment can be accessed through two doors provided with windows; hence, the passenger compartment is delimited by four side doors, namely two front and two rear doors, by a front windscreen, by a rear window and by a roof.

More in detail each side defines a front side door opening and a rear side door opening to accommodate the front side door and the rear side door, respectively.

In this type of automobiles, a pillar is usually used to separate the front side door opening from the rear side door opening and the rear side door is hinged to said pillar.

The two opposite pillars fulfil both a structural function, namely by stiffening the frame of the automobile, and a support function, namely by fixing the seat belt restraint systems for the driving position and for the front passenger position.

Automobiles are also known, in which the two pillars dividing the front and rear side door openings of the two sides are absent. Therefore, on each side of the automobile, the two front and rear side doors close on top of one another.

This type of solution, despite being advantageous for it allows the driver as well as the passengers to more easily get into and out of the car, since there is one single side door opening on each side, suffers however from some drawbacks.

In particular, the side doors always have to be opened and closed in sequence.

Furthermore, the absence of the pillars causes a structural weakening of the frame, with a consequent need to increase the weight of the entire automobile.

Finally, in the absence of the pillars on the two sides, the seat belt restraint systems have to be installed on the inner side of the side doors, so that they have to bear a greater weight due to larger space taken up by the components installed within them and due to the need to resist the loads of the restraint systems.

DESCRIPTION OF THE INVENTION

The object of the invention is to provide an automobile capable of overcoming, in a simple and economic fashion, the drawbacks described above and arising from known automobiles.

According to the invention, there is provided an automobile as claimed in claim 1 and in the claims depending on it.

BRIEF DESCRIPTION OF THE DRAWINGS

The invention will now be described with reference to the accompanying drawings showing a non-limiting embodiment thereof, wherein.

PREFERRED EMBODIMENTS OF THE INVENTION

Figure 1:
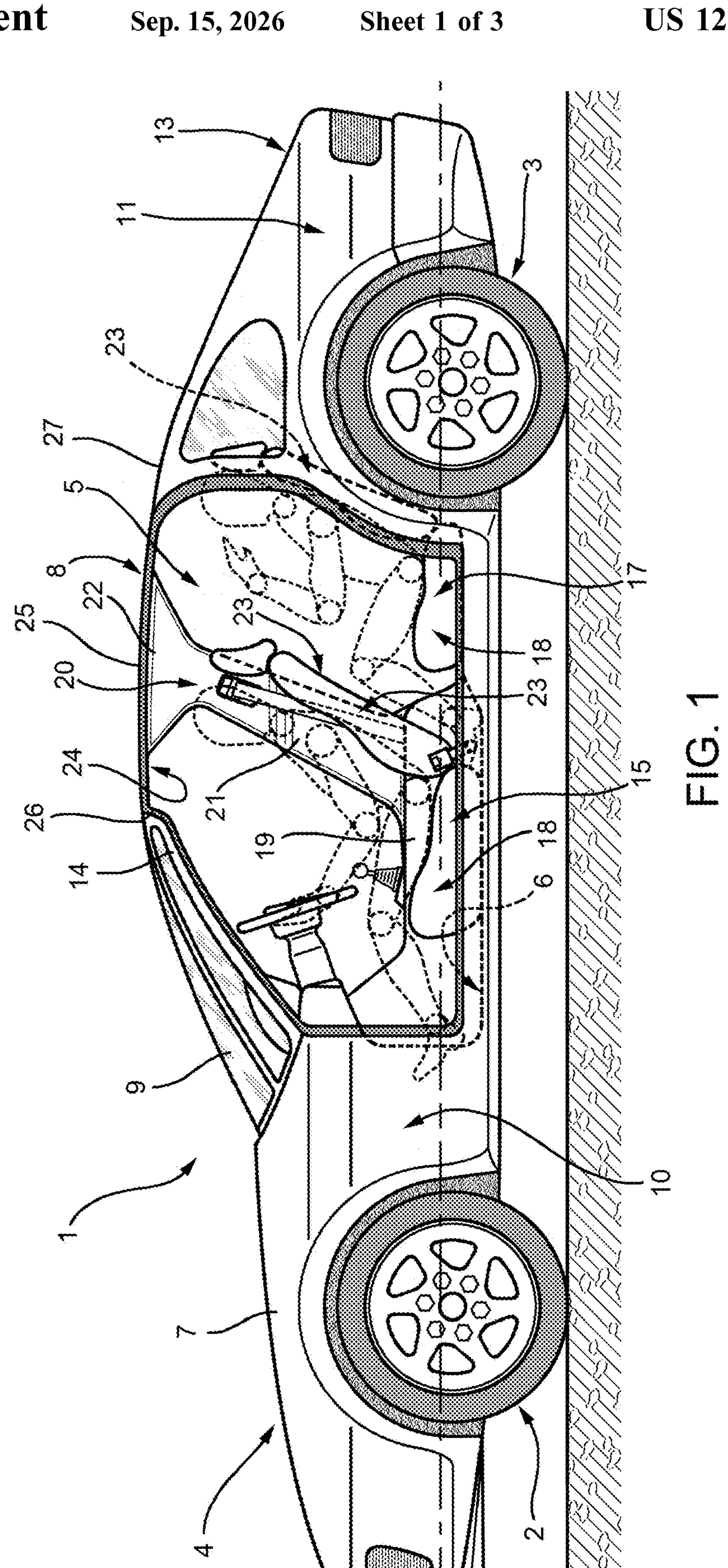
FIG. 1 is a side view, with parts removed for greater clarity, of an automobile according to the invention.
Figure 2:
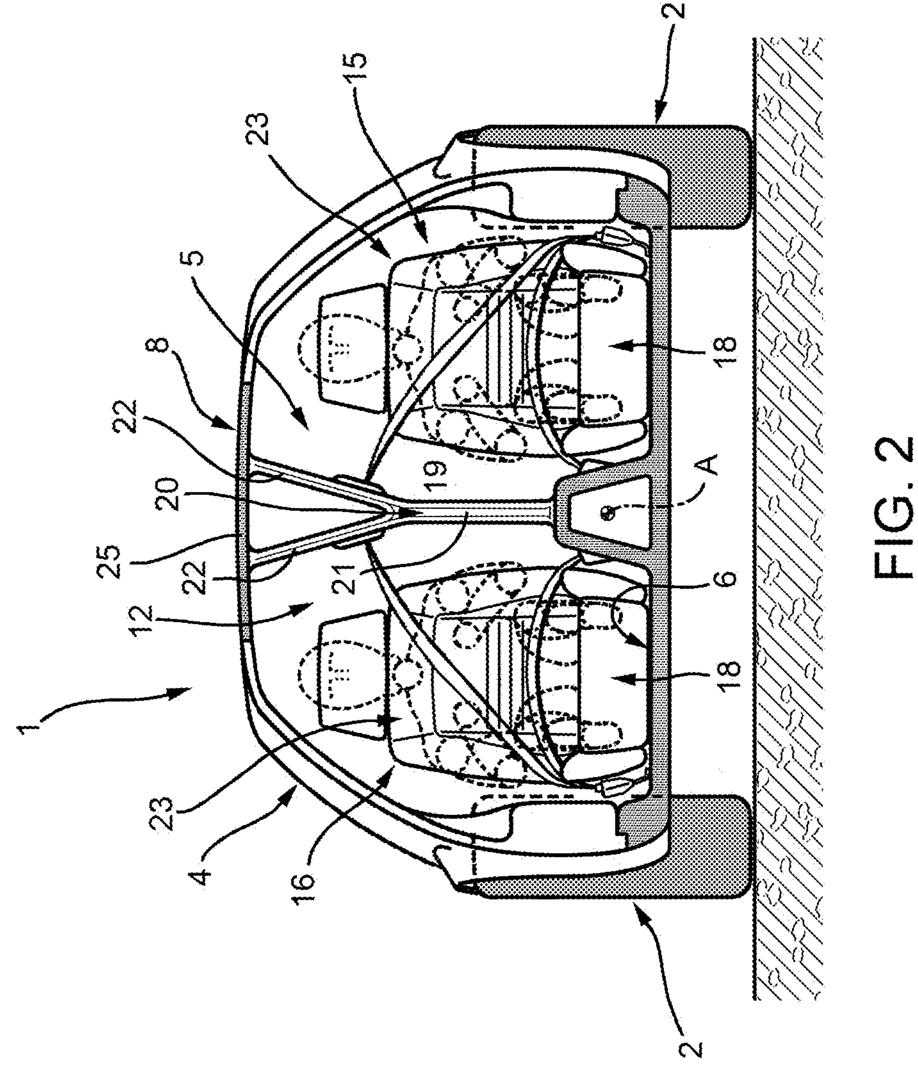
FIG. 2 is a front view, with parts removed for greater clarity, of the automobile of FIG. 1.
Figure 3:
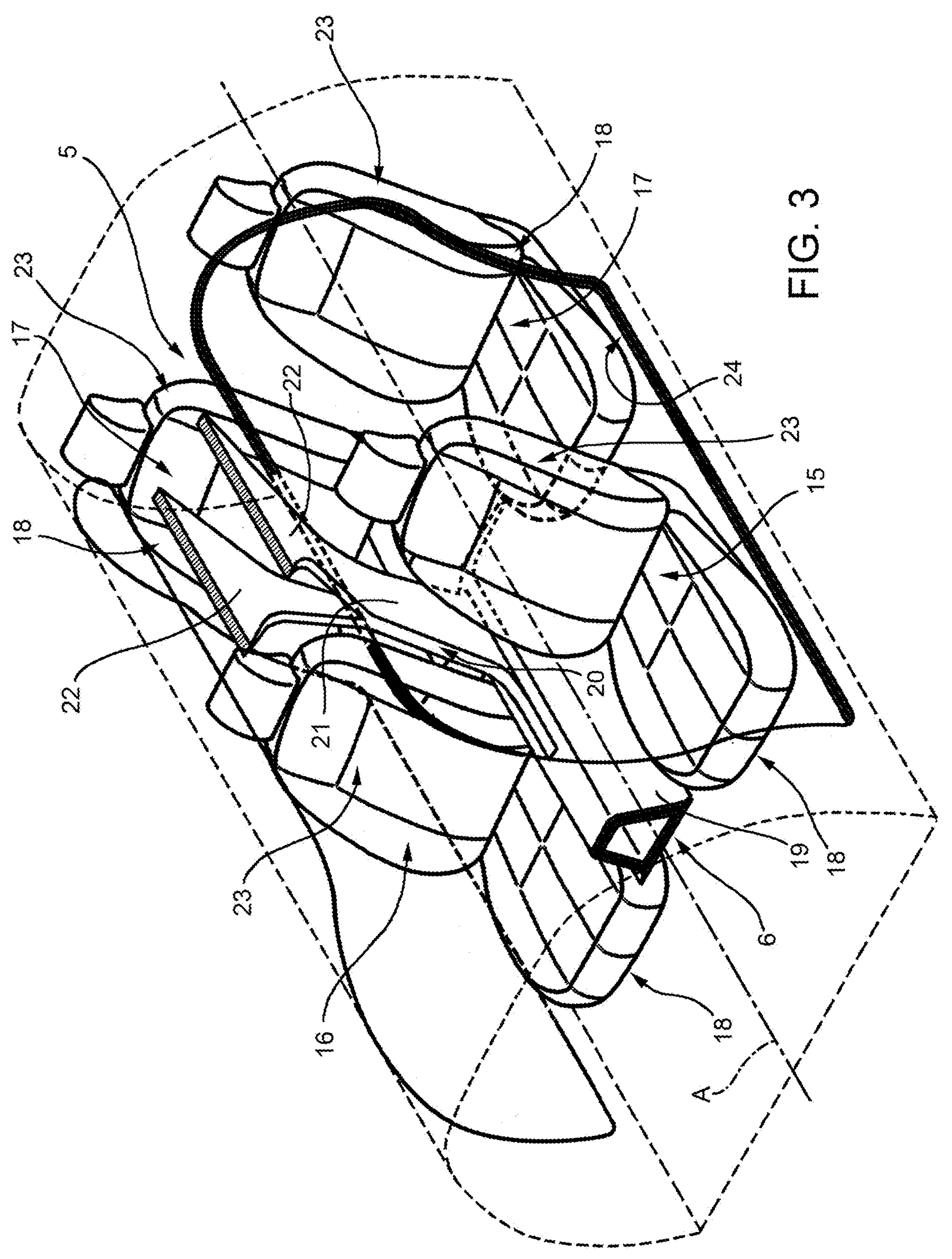
FIG. 3 is a perspective view, on a larger scale and with parts removed for greater clarity, of a passenger compartment of the automobile of FIGS. 1 and 2.

In FIGS. 1 and 2, number 1 indicates, as a whole, and automobile having two front wheels 2 and two rear wheels 3 and comprising an outer body 4 and a passenger compartment 5, which is obtained within the outer body 4 between the front and rear wheels 2, 3.

The outer body 4 comprises, among other things, a floor 6, a front hood 7, a roof 8 and a windscreen 9 extending between the front hood 7 and the roof 8.

The outer body 4 further comprises two front sides 10, which extend on the opposite sides of the front hood 7, and two opposite rear sides 11, which are aligned with and are spaced apart from the respective front sides 10.

The outer body 4 finally comprises a rear window 12 and a rear hood 13.

The windscreen 9 is joined, at the bottom, to the front hood 7 and, at the top, to the roof 8. The windscreen 9 further is laterally contained between two windscreen pillars 14, which project, at the top, from the rear ends of the respective front sides 10 until they touch the roof 8.

The rear window 12 is joined, at the bottom, to the rear hood 13 and, at the top, to the roof 8. The rear window 12 further extends between the rear sides 11.

Therefore, the passenger compartment 5 is delimited, at the front, by the windscreen 9 and, at the back, by the rear window 12; in the example shown in the accompanying figures, the passenger compartment 5 comprises four positions defined as follows:

a front driving position 15;

a front passenger position 16; and two rear passenger positions 17.

The passenger compartment 5 could also have only two seats, namely it could comprise the sole front driving position 15 and front passenger position 16.

More in general, the passenger compartment 5 could comprise any number of positions, not only greater than two, but also greater than four.

Each one of said front driving position 15 or front passenger position 16 or rear passenger positions 17 is provided with a respective seat 18.

Inside the passenger compartment 5 there also is a central tunnel 19, which is arranged on the floor 6 and extends between the driving position 15 and the front passenger position 16.

Advantageously, the automobile 1 further comprises a centre pillar 20, which extends entirely inside the passenger compartment 5 between the floor 6 and the roof 8 and is arranged in the area of an intermediate longitudinal axis A of the passenger compartment 5 between the driving position 15 and the front passenger position 16.

The centre pillar 20 preferably extends from the central tunnel 19 to the roof 8.

In the example shown in the accompanying figures, the centre pillar 20 has a main portion 21 shaped like a plate, which is parallel to the longitudinal axis A, and an upper end portion 22, which bifurcates towards the roof 8 starting from the main portion 21.

Furthermore, the centre pillar 20 is arranged between respective backrests 23 of the seats 18 and extends backwards towards the rear passenger positions 17.

Thanks to the arrangement of the centre pillar 20 inside the passenger compartment 5, each front side 10 and the corresponding rear side 11 delimit, between them and with the floor 6 and the roof 8, one single side door opening 24, which is completely free, namely the opening has no discontinuity.

Each side door opening 24 also is laterally delimited by the respective windscreen pillar 14.

Preferably, as shown in the example of the accompanying figures, the roof 8 has a central portion 25, which is laterally tapered relative to a front portion 26 and to a rear portion 27; the centre pillar 20 is arranged in the area of the tapered central portion 25 of the roof 8.

The centre pillar 20 advantageously defines, along its opposite sides, respective supports for anchoring seat belt restraint systems (which are known and not show herein) for the driving position 15 and for the front passenger position 16.

The features of the automobile 1 according to the invention lead to evident advantages that can be obtained using it.

In particular, in the solution disclosed herein, the centre pillar 20, which, in known solution, used to divide the side door opening, is not eliminated, but is placed at the centre of the passenger compartment 5.

Therefore, one single side door opening 24 can one obtained on each side of the automobile 1 (thus, making it easier for passengers to get into and out of the passenger compartment 5), tough without undesired consequences. As a matter of fact, the centre pillar 20 can still be used to anchor the seat belt restraint systems for the driving position 15 and the front passenger position 16; the only difference, compared to known automobiles, lies in the fact the driver's seat belt is on the right instead of being on the left (for an automobile with a left driving position), while the contrary applies to the passenger sitting on the front seat. This change affects the driver and the passengers to a small extent, as the reversed positioning of the seat belts already takes place in all automobiles when shifting from the left seats to the right seats relative to the middle line.

Furthermore, the positioning of the pillar 20 at the centre of the automobile 1 reinforces the part of the roof 8 that conventionally is very weak, thus allowing for an improved architecture of the chassis/body of the automobile 1.

Finally, the automobile 1 described and shown herein can clearly be subjected to changes and variations, without for this reason going beyond the scope of protection set forth in the appended claims.

The invention claimed is:

1. An automobile (1) comprising:

a pair of front wheels (2) and a pair of rear wheels (3);

an outer body (4) having a floor (6), a front hood (7), a roof (8), and a windscreen (9) extending between the front hood (7) and the roof (8);

a passenger compartment (5) obtained inside said outer body (4) between said front and rear wheels (2, 3), frontally bounded by said windscreen (9) and defining at least one driving position (15) and one front passenger position (16) side by side; and a central pillar (20) extending entirely inside said passenger compartment (5) between said floor (6) and said roof (8) and arranged at an intermediate longitudinal axis (A) of the passenger compartment (5) itself between said driving position (15) and said front passenger position (16), wherein said outer body further comprises two front sides extending on opposite sides of said front hood (7) and two rear sides, aligned with, and spaced from, respective front sides (10), wherein each front side and the corresponding rear side bound between themselves and with said floor and said roof a single totally free side door opening (24); and wherein said center pillar (20) defines at its opposite sides respective supports for anchoring seat belt restraint systems for the driving position (15) and for the front passenger position (16).

2. The automobile according to claim 1, wherein said outer body (4) further comprises two windshield pillars (14) which laterally contain said windshield (9) and project superiorly from respective said front sides (10) until they touch said roof (8), and wherein each said single side door opening (24) is also laterally bounded by the respective windshield pillar (14).

3. The automobile according to claim 1, wherein said center pillar (20) has a main portion (21) substantially plate-shaped, parallel to said longitudinal axis (A), and an upper end portion (22) bifurcating toward said roof (8) from said main portion (21).

4. The automobile according to claim 1, wherein said passenger compartment (5) has, between said driving position (15) and said front passenger position (16), a central tunnel (19); and wherein said central pillar (20) extends from said central tunnel (19) to said roof (8).

5. The automobile according to claim 1, wherein said roof (8) has a central portion (25) tapered laterally with respect to a front portion (26) and a rear portion (27); and wherein said central pillar (20) is located at said tapered central portion (25) of said roof (8).

6. The automobile according to claim 1, wherein said passenger compartment (5) further comprises, at least, two rear passenger positions (17) arranged at opposite sides of said longitudinal axis (A).

* * * * *